(12) United States Patent
Rosendahl

(10) Patent No.: US 9,634,489 B2
(45) Date of Patent: Apr. 25, 2017

(54) ELECTRICAL POWER TRANSMISSION NETWORK

(71) Applicant: Glenn Kenton Rosendahl, Elie (CA)

(72) Inventor: Glenn Kenton Rosendahl, Elie (CA)

( * ) Notice: Subject to any disclaimer, the term of this patent is extended or adjusted under 35 U.S.C. 154(b) by 109 days.

(21) Appl. No.: 14/521,971

(22) Filed: Oct. 23, 2014

(65) Prior Publication Data

US 2016/0118792 A1    Apr. 28, 2016

(51) Int. Cl.
| | | |
|---|---|---|
| H02J 3/14 | (2006.01) | |
| G05B 15/02 | (2006.01) | |
| H02J 3/16 | (2006.01) | |
| H02J 3/18 | (2006.01) | |

(52) U.S. Cl.
CPC ............... *H02J 3/14* (2013.01); *G05B 15/02* (2013.01); *H02J 3/16* (2013.01); *H02J 3/18* (2013.01); *Y02E 40/34* (2013.01)

(58) Field of Classification Search
CPC .................................. G05B 15/02; H02J 3/14
See application file for complete search history.

(56) References Cited

U.S. PATENT DOCUMENTS

| | | | | |
|---|---|---|---|---|
| 5,927,598 A | * | 7/1999 | Broe | H02J 3/14 236/46 R |
| 6,316,883 B1 | * | 11/2001 | Cho | H05B 41/28 315/209 R |
| 6,624,532 B1 | * | 9/2003 | Davidow | H02J 3/14 307/31 |
| 7,804,280 B2 | | 9/2010 | Deaver, Sr. et al. | |
| 2008/0106241 A1 | * | 5/2008 | Deaver | H02J 3/1828 323/209 |
| 2008/0304195 A1 | * | 12/2008 | Lin | H02M 1/32 361/89 |
| 2012/0206113 A1 | * | 8/2012 | Kogel | H02M 1/4258 323/207 |
| 2013/0201731 A1 | * | 8/2013 | Gu | H02M 1/4225 363/21.17 |

(Continued)

OTHER PUBLICATIONS

Pal, Yash, A. Swarup, and Bhim Singh. "A review of compensating type custom power devices for power quality improvement." Power System Technology and IEEE Power India Conference, 2008. POWERCON 2008. Joint International Conference on. IEEE, 2008. *pp. 4-5*.

(Continued)

*Primary Examiner* — Thomas Lee
*Assistant Examiner* — Mohammad A Rahman
(74) *Attorney, Agent, or Firm* — Adrian D. Battison; Ade & Company Inc.

(57) ABSTRACT

An improved management of an electrical power transmission network is obtained by providing at each of the subscriber premises a load control device which includes a power correction system for applying a capacitive load and/or a switched reactor for voltage correction across the input voltage and a sensing system defined by a pair of meters one at the supply and the second downstream of the voltage correction for detecting variations in power factor. A control system operates to control the power correction system in response to variations detected by the sensing system and to communicate between the load control device and the network control system so as to provide a bi-directional interactive system.

15 Claims, 2 Drawing Sheets

(56) References Cited

U.S. PATENT DOCUMENTS

2015/0012151 A1* 1/2015 Park ................. G05B 15/02
700/298

OTHER PUBLICATIONS

Palensky et al., "Demand Side Management; Demand Response, Intelligent Energy Systems, and Smart Loads", IEEE transactions on industrial informatics, vol. 7, No. 3, Aug. 2011 *pp. 384*.
Kanchev et al., "Energy Managmeent and Operational Planning of a Microgrid With a PV-Based Active Generator for Smart Grid Applications", IEEE transactions on idnustrial electronics, vol. 58, No. 10, Oct. 2011. *fig. 1, pp. 4584-4585*.

* cited by examiner

ELECTRICAL POWER TRANSMISSION NETWORK

This invention relates to an electrical power transmission network designed to compensate for the power factor which arises due to reactive loads on the network.

BACKGROUND OF THE INVENTION

The most challenging problems power systems face today are; power factor control, transformer load imbalance, and nonlinear loads, adding to transformer imbalance and inject disruptive harmonic currents into the system. All of these problems erode the efficiency and stability of the power system, in some cases over 40% of power is lost enroute to the customer.

Power system compensation is presently done from the top down, high voltage and high power correction equipment is installed at distribution substations. This can include static or switched capacitor banks and/or switched reactors for power factor or voltage correction, universal power flow controllers to balance loads and control bus voltages. These devices can address some of the challenges but, the costs are significant and the solutions are less than optimal. They require a large investment in engineering, custom equipment, infrastructure to mount equipment, have a low fault tolerance and require maintenance.

SUMMARY OF THE INVENTION

According to the invention there is provided an electrical power transmission network comprising: a plurality of subscriber premises for receiving electrical power, each including a plurality of user devices on a power supply circuit, at least some of which cause power factor variations when operated;

transmission lines supplying electrical power; each of the subscriber premises having a drop from one of the transmission lines to a power supply inlet; a network control system for controlling the supply of power on the transmission lines; and a plurality of load control devices each connected to a respective one of the power supply inlets for controlling the power supplied from the power supply inlet to the user devices on the power supply circuit, each load control device comprising: a sensing system for detecting variations in power factor caused by the user devices; a power correction system for applying a capacitive load to the power supplied by the drop to the subscriber premises; a control system for controlling the power correction system in response to variations detected; and a communication system for communicating between the load control device and the network control system.

Preferably the sensing system comprises a meter generating data relating to the standard true RMS values of voltage, current and Real Power. These values can then be used by the control system to calculate the power factor to generate a value of a required capacitive load to improve the power factor.

The power factor can where possible be improved to the maximum unity power factor so that only real power is flowing in the system. However in some cases it is necessary to apply a load which provides an improvement without reaching the theoretically optimum situation. Either the system is at maximum compensation or the system is configured to improve transformer imbalance.

Transformer imbalance is a result of unsymmetrical loading of each phase of a typical three phase system. By compensating the capacitive load of each phase independently improvements to transformer imbalance can be made. While a less than optimal solution to both power factor and load imbalance will result using just capacitor compensation the overall operation efficiency may be a best solution with available resources. The present invention in its simplest form is passive capacitive compensation for one phase only. More control of load imbalance can be made with the addition of reactive compensation components and multi-phase implementation of the control, where current imbalances can be redirected within the control to balance phase currents. These improvements come with a price in complexity and costs. The addition of distributed solar/wind generation can aid in the imbalance issues by sourcing this power to heavily loaded phases.

In some cases the system can be used to correct the waveform of the power supply to remove distortions caused by noise, improving power quality. Such noise can arise from many different user devices which do not provide linear power use. In order to correct for the noise and thus better balance the waveform of the power supply, the sensing system generates data relating to FFT spectra of the power supply waveform. The control system then uses the data from the FFT analysis to provide a correction signal at a rate significantly greater than the frequency of the power supply waveform. That is the sensing system can be used from this analysis to generate data relating Total Harmonic Distortion (THD).

A reference current waveform is in phase with the voltage wave and is sinusoidal. The error signal is built up of the results from the FFT spectra of the load current. The fundamental current frequency components are removed since no compensation is necessary. All other frequency components reduce the power quality and make up the error signal. The reference signal minus the error signal provides correction pulses to an Active Power Factor Control (APFC). The APFC shapes the incoming current into sinusoidal waves removing the power noise and improving power quality.

The APFC produces a DC current to charge a local capacitor to a high voltage. This energy can be re-inverted back into the system using a power inverter, bled away, or can be another energy source for local solar/wind generation systems. It should be mentioned this system does nothing for the power quality within the premises. The power quality is improved as viewed from the system side and limits noise from effecting premises nearby. The present invention can be used to reduce noise of problem loads within a premises, such as variable speed drives in industrial settings. Where the control is installed to monitor and compensate a specific load or group of loads.

Preferably the sensing system comprises a first meter generating data at the drop and a second meter generating data downstream of the power correction system. Both meters provide the same parameters obtained from the power supply so that the data can be compared. For example, the control system can be used to compare the output data from the second meter with the output data from the first meter to determine a level of improvement in the power factor obtained by the power correction system. This comparison provides a self-accounting function where the level of ongoing improvement in the power factor can be monitored. This value can be used if required in a calculation of a rebate to the customer for that improvement and can be used to monitor over a set of premises on a particular transmission line where and how improvements are being made at the premises level which can be compared with improvements detected at the macro level at the relevant transformer. That is the load control device is arranged to communicate using the communication system data relating to the improvement to the network control system. In addition the load control device can be arranged to communicate data relating to the Real power to the network control system. This provides data to the network management system of the operation of the system and the premises allowing better control of the network at the supply end.

Typically the power correction system comprises static or switched capacitor banks. These banks can be switched in and out as required by the control system to provide a value of capacitive load to manage the power factor. For example a binary system can be employed using a number n of capacitors each twice the value of the previous to provide up to 2^n different values for close management of the capacitive load. Finer power factor control can be achieved with a switched reactor in parallel with the capacitor bank. Adjusting the firing angle on the reactor, an infinite resolution of current can be achieved from its maximum current rating to zero. This enables the system to track the power factor very accurately.

In addition to the control of the capacitive load, it is also possible in some cases to provide in the power correction system an Active Power Factor Control (APFC). This is a known arrangement which can be switched at high rate to filter out the noise and Total Harmonic Distortion detected by the FFT analysis. The switch, which can be operated at high rate of multiple times per cycle, connects in and out of the circuit an inductor which therefore changes the input current draw in a manner to smooth out the effects generated by the noise from the user devices. The switch is thus operated in response to the error signal derived from FFT analysis of the waveform of the power supply for current correction. This system draws energy from the system which can be bled away with a resistor, be another energy source for local solar/wind generation, or be the source for a local power inverter. Ideally this should be coupled with a local solar/wind generator since these systems already have an integrated power inverter saving installation costs. Wasting this energy through a bleeding resistor is only convenient if the losses are minimal and doesn't warrant the additional costs of a power inverter.

In addition the load control device can include a system for disconnecting from the power supply circuit within the user premises certain ones of the user devices for load shedding. This is typically carried out by a switch on one or more of the drop cables of the circuit to disconnect high load items such as heating and cooling systems.

The control system can also be programmable to change the response to variations detected by the sensing system. That is the control system can use adaptive intelligence to change the output controlling the power correction system in response to detected variations depending on different circumstances. Such change of the output might use time of day or the input voltage or power factor as parameters in the programming. The system operates to maintaining a power factor or voltage at a point or a weighted combination of several parameters to meet a required condition. In addition, the control system can be programmable by data received by the communication system from the network control system. That is the network control system may communicate to the individual control systems of the load control devices instructions which depend on the state of the network as detected at the head end of the network. This instruction may be to control the components particularly the power correction system in a manner different from that which would be used by the system in the absence of information from the network control. Thus voltages and load shedding can be controlled centrally by instructions from the network. In this way an interactive communication system can be set up where the communication system operated bi-directionally to supply information to the network control system and to receive instructions obtained from the network either as a result of that information or from other data obtained conventionally from the network.

Typically the communication protocol is not set up to require high speed communication of complex instructions in real time to the multitude of subscriber premises but instead the system typically will be adaptive to generate programming over time which changes in response to detected data. Thus the central network control can communicated programs to the load control devices over time which are implemented on a real time basis depending on data detected locally. However high speed communication techniques can be used to manage the system in real time. The communication system can be setup to provide a synchronizing pulse periodically to controls in the field. This enables the system to take a global snap shot of measures throughout the system enabling better tracking of power and accessing of system stability.

As is well known the voltage on the transmission line can vary depending on the distance from the head end and also it is known that the voltage can be managed by reactive loads particularly capacitive loads applied to the transmission line at various positions along the line. Using this knowledge, the control system at all or some of the individual premises can be operated to change voltage at the respective drop in response to data provided by or communicated by the network control system. That is the local control system can be used to add capacitive load or to shed loads in response to data from the network control system. In this way instability in the network can be detected early by data from the local load control devices and can be better managed by operating the local load control devices to take steps to ameliorate the stability problems. For example a voltage profile along the transmission line can be managed in this way. The network control system can arrange the individual premises control systems to react to system events in order to maintain stability. Much like cruise control setting the voltage and turning loads on or off to keep the voltage measure constant. This method has a net effect of leveling the voltage graduation along a transmission line such that the overall voltage drop across a line is reduced.

Power systems are beginning to employ variable voltage transformers to manage overall power usage of systems during peak periods. By lowering the system voltage, loads draw less current which means less overall power is delivered making the most of available resources. Variable voltage transformer efficiencies are increased by the ability of the arrangement herein to minimize the overall drop of a distribution line, thus allowing greater voltage drops while still maintain rated voltage tolerances within each premises.

The network herein also can be used to control a power supply system, such as solar power stored in battery banks, at the subscriber premises for adding power to the power at the premises. That is the control system can be arranged to control the capacitor banks, any load shedding and any power added by the power supply system in response to the detected variations. The local variations can be used in conjunction with data communicated from the network control system to control these components to better manage the network.

According to a second aspect of the invention there is provided a load control device for use in individual subscriber premises of an electrical power transmission network comprising a plurality of subscriber premises for receiving electrical power, each including a plurality of user devices on a power supply circuit, at least some of which cause power factor variations when operated; transmission lines supplying electrical power; and a network control system for controlling the supply of power on the transmission lines where each of the subscriber premises has a drop from one of the transmission lines to a power supply inlet;

the load control device being arranged for connection to a respective one of the power supply inlets for controlling the power supplied from the power supply inlet to the user devices on the power supply circuit, the load control device comprising:

a sensing system for detecting variations in power factor caused by the user devices;

a power correction system for applying a capacitive load to the power supplied by the drop to the subscriber premises;

a control system for controlling the power correction system in response to variations detected;

and a communication system for communicating between the load control device and the network control system.

The load control device can be arranged to provide any one or more of the above stated features of the network.

The arrangement as described herein therefore uses a bottom up approach to power system compensation and monitoring. Instead of one large installation, many thousands of small units are distributed across a system, ideally at individual power services or loads. Point of load compensation (PLC) is the optimal placement to minimize losses and maximize system stability. Several design factors contribute to dramatically reduce costs when compared with top down solutions.

Designing compensation equipment for the low voltage side reduces component costs, increases reliability and component availability. Installation costs are minimal using well established models from the telecommunications industry.

Typical distances from substation to load are many kilometers and the top down compensation has limited effect on these transmission lines. Installing compensation closer to loads and finer resolution of compensation reduce losses even further and increases system stability and flexibility.

Deployment of these devices at the point of load gives rise to a natural communication network, the power system voltages, currents, and phasors themselves. A global communication network is provided for overall system control and synchronization. But in the absence of global communication, individual units operate as a reflexive type of control, monitoring the power system's line values and reacting to changes with best operating practices. By providing a much faster response to disturbances than a traditional system, both system stability and availability is increased. This network of power monitors and compensators gives a unique insight into the workings of each installation. Using this information, self-organizing and learning algorithms extract best operating practices for each individual system. This information can aid in almost every aspect of power system management including power theft. Current trends are pushing towards a distributed generation model with the advent of small scale solar and wind generation. The distributed generation model presents many challenges to current supervisory control and Data Acquisition (SCADA) systems, based on a centralized control ideology. The present unit can easily integrate the distributed generation model into the system and use them as active elements in power generation, system control and compensation.

One form of the present invention includes two metering points: one at the system side and one at the load side. Power compensation modules are installed between these two metering points. This unique scheme allows the effects of compensation to be measured and quantified, and forms the basis for performance contract accounting. Meter outputs from the load side (and/or system side) can be used as feedback by active compensation modules. This allows modules to nullify or reduce noise generated from problematic SMPS, CFL, LED lighting and similar nonlinear loads. Outputs from the system side meter show the results of such efforts. Each metering point is capable of measuring the standard true RMS values of voltage, current, Real Power, as well as accurately determining power factor, FFT spectra, Total Harmonic Distortion (THD), and many more. These meters are field updatable and under software control so that they may be programmed, tuned or focused on important aspects of the data to aid in control or monitoring tasks.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
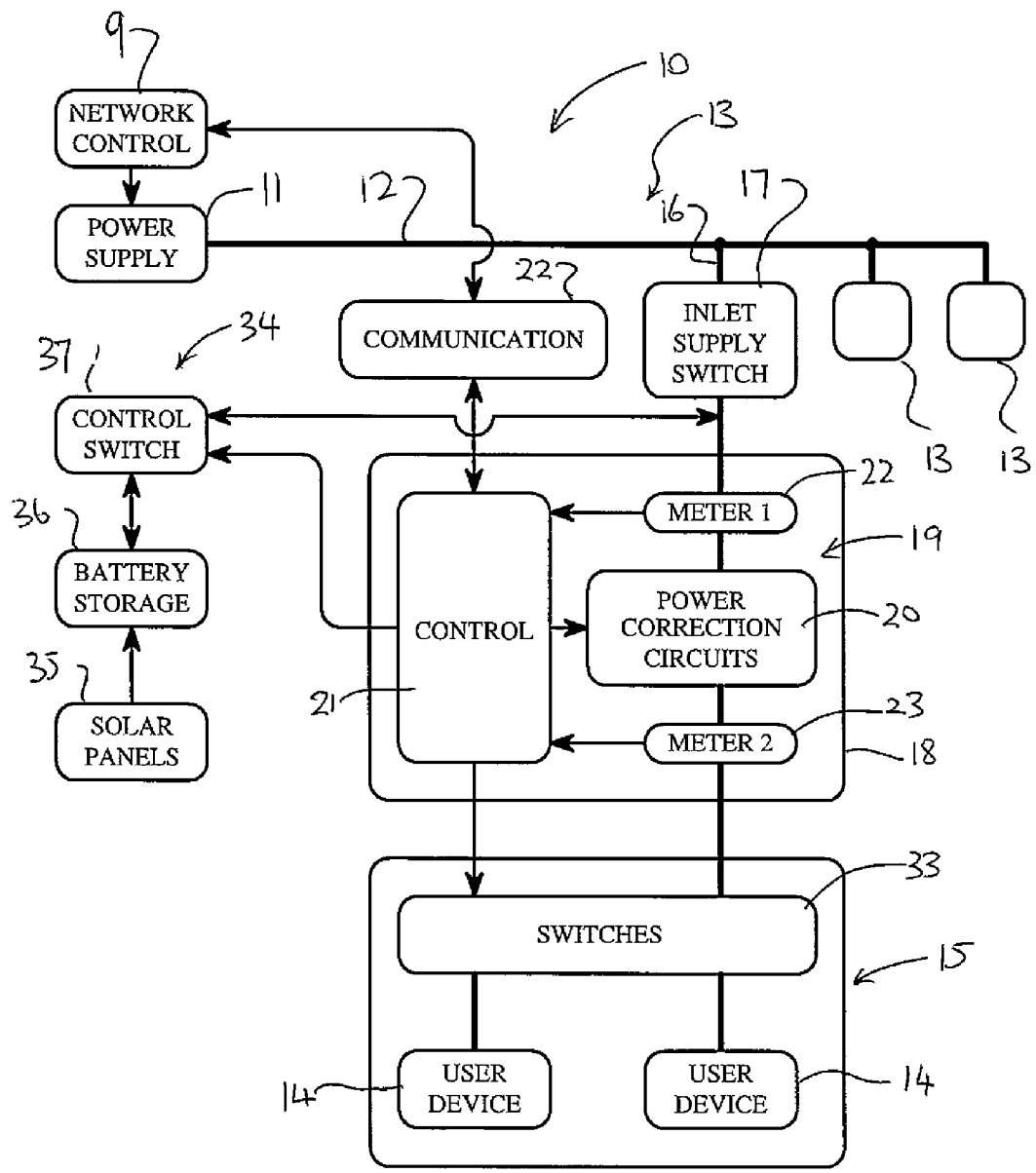
FIG. 1 is a schematic illustration of a power network according to the present invention.

An electrical power transmission network 10 includes a power supply 11 generally at a transformer supplying one or more transmission lines 12 and managed by a network control system 9 using many systems for detecting parameters of the network and for controlling various components of the network to maintain voltage stability on the transmission lines.

On the transmission line is a plurality of subscriber premises 13 for receiving electrical power, each including a plurality of user devices 14 on a power supply circuit 15. Each of the subscriber premises 13 has a drop 16 from the transmission line to a power supply inlet board 17 typically including a main inlet control switch. Typically in the drop is provided a meter for measuring power usage. In the present invention the meter is replaced by an integral component defining a load control device 18 connected to the power supply inlet 17 for controlling the power supplied from the power supply inlet to the user devices on the power supply circuit 15.

Each load control device includes a sensing system 19 for detecting variations in power factor caused by the user devices 14, a power correction system 20 for applying load corrections to the power supplied by the drop to the subscriber premises and a control system 21 for controlling the power correction system in response to variations detected. The control system 21 connects to a communication system 22 for communicating between the load control device 19 and the network control system 9.

The sensing system comprises a first meter 22 and a second meter 23 each of a generally known construction. Each acts to monitor the waveform of the power supply and to generate data relating to the standard true RMS values of voltage and current and relating to the Real Power. The sensing system can also have systems which generate data relating to FFT spectra of the power supply wave form by analyzing the waveform using conventional Fast Fourier Transform techniques. This can also be used to generate data relating Total Harmonic Distortion (THD).

The first meter is located at the drop and the second meter is located downstream of the power correction system and the control system which receives the data from both acts to compare the output data from the second meter with the output data from the first meter to determine a level of improvement in the power factor obtained by the power correction system 20.

Figure 2:
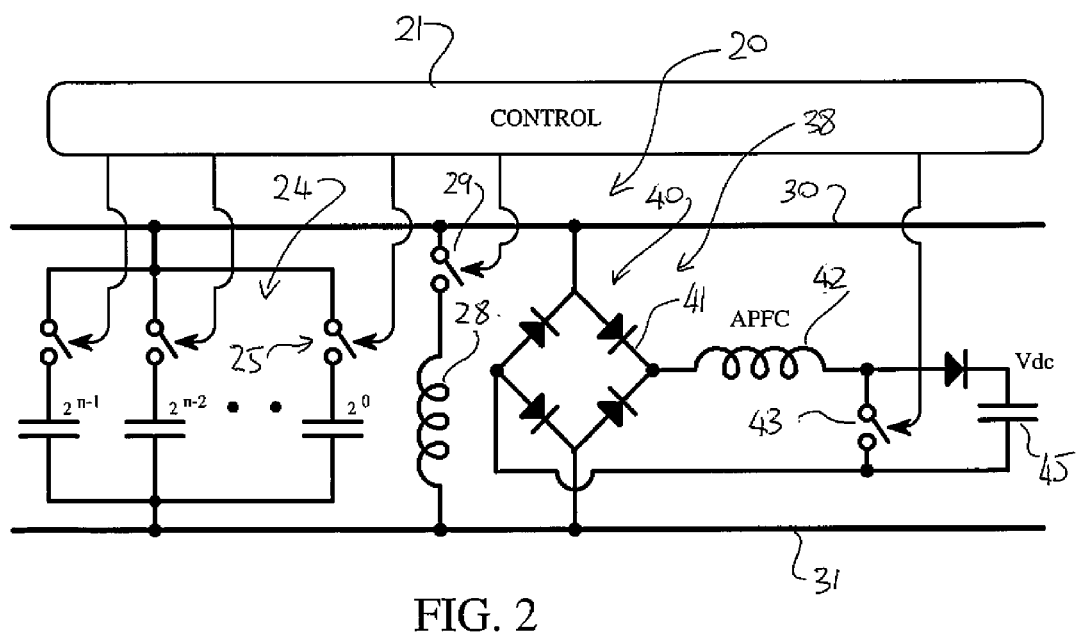
FIG. 2 is a schematic illustration of the power correction circuit of FIG. 1

The load control device is arranged to communicate data relating to the improvement measured and to the Real Power consumed to the network control system 9. This can be done in real time but typically is periodic As shown in FIG. 2, the power correction system 20 comprises switched capacitor banks 24 including a switch 25 operated by the control 21 which switches in selected capacitors 26 in a binary switching system. The system 20 further includes a switched reactor circuit 38 for voltage correction. This includes an inductor 28 and a switch 29 connecting the inductor across the power supply buses 30 and 31. The switch 29 is operated by the control 21 in response to a leading power factor, provides greater control of power factor by varying the firing angle. Typically systems over-compensate the power factor with capacitors and use the reactor switch combination to fine tune the power factor to unity. The system 20 further includes an active power factor correction circuit 40 for noise correction and current shaping. This is composed of rectifier 41 across the supply buses 30 and 31 feeding into an inductor 42 with a switch 43 connected to the rectifier return forming a boost circuit. Output from the boost circuit feeds diode 44 and holding capacitor 45. The switch 43 is operated by the control 21 in response to noise and FFT analysis of the downstream loads. A sinusoidal waveform of the fundamental frequency minus the sum of FFT waveforms minus the fundamental is used as the input to switch 43 modulated to a high frequency. This circuit 40 shapes the load current into a sinusoid based on the measured noise from downstream loads. The charge deposited onto capacitor 45 can be bled off with a resistor (not shown), fed into a local solar/wind battery charging system, or re-inverted back onto the supply bus.

The load control device further includes a system for disconnecting certain ones of the user devices for load shedding provided by a switch 33 operated by the control 21.

The control system includes a processor which is programmable from external input from the communication system or is programmed to change the response to variations detected by the sensing system so that the response is different in different circumstances. In this way the whole system can be interactive or can be adaptive to provide improved response to better manage the whole system depending on various aspects such as time of day and voltage levels locally or globally in the system.

In particular, the control system is operated by its program to change voltage at the drop by changing the capacitive load in response to data from the network control system or other factors so as to provide another tool to the network management system to better control voltages and to better maintain stability.

Some or all of the subscriber premises can include a power supply system at the subscriber premises for adding power to the power. This can comprise any of the known power supply systems such as solar panels, generators and other local systems. For example the power supply as shown includes a solar generator 35 connected to a battery bank 36 operated by a switch 37 controlled by the control 21 to take power from the drop 16 or to add power to the drop depending on data and or program instructions from the sensor system 19 or from the network control 9. Thus the control system is arranged to control the capacitor banks and the power added by the power supply system in response to the detected variations.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An electrical power transmission network comprising:
   a plurality of subscriber premises for receiving electrical power, each including a plurality of user devices on a power supply circuit, at least some of which cause power factor variations when operated;
   transmission lines supplying electrical power;
   each of the subscriber premises having a drop from one of the transmission lines to a power supply inlet;
   a network control system for controlling the supply of power on the transmission lines;
   and a plurality of load control devices each connected to a respective one of the power supply inlets for controlling the power supplied from the power supply inlet to the user devices on the power supply circuit,
   each load control device comprising:
      a sensing system for detecting distortions in the power supply caused by power factor variations caused by the user devices;
      a power correction system for correcting a waveform of the power supply to remove said distortions arising from the power factor variations of the user devices;
      and a control system for controlling the power correction system in response to variations detected;
   wherein the sensing system comprises a first meter generating data on the drop upstream of the power correction system and a second meter generating data downstream of the power correction system;
   wherein both meters generate data on the same parameters obtained from the power supply;
   wherein the control system is arranged to compare the data from the second meter with the data from the first meter to determine a level of improvement in the power factor obtained by the power correction system;
   wherein the power correction system comprises an active power factor control which comprises an inductor and a switch which connects the inductor in and out of the power supply;
   wherein the switch is operated in response to the data generated by the sensing system and is switched multiple times per cycle to change the input current draw in a manner to filter out the distortion and shape the waveform into sinusoidal waves in phase with a voltage wave.

2. The network according to claim 1 wherein said two meters each generate data relating to the standard true RMS values of voltage, current and Real Power.

3. The network according to claim 1 wherein the sensing system generates data relating to FFT spectra of the power supply wave form.

4. The network according to claim 1 wherein the sensing system generates data relating Total Harmonic Distortion (THD).

5. The network according to claim 1 wherein the load control device is arranged to communicate data relating to the improvement to the network control system.

6. The network according to claim 1 wherein the load control device is arranged to communicate data relating to the Real power to the network control system.

7. The network according to claim 1 wherein there is provided a system for disconnecting certain ones of the user devices for load shedding.

8. The network according to claim 1 wherein the control system is programmable to change the response to variations detected by the sensing system.

9. The network according to claim 1 wherein the control system is programmable by data received by the communication system from the network control system.

10. The network according to claim 1 wherein the control system is operated to change voltage at the drop in response to data from the network control system.

11. The network according to claim 1 wherein the control system is operated to shed loads in response to data from the network control system.

12. The network according to claim 1 wherein the network control system is arranged to manage the network in response to data received from the load control devices.

13. The network according to claim 1 including a power supply system at the subscriber premises for adding power to the power from the drop and wherein the control system is arranged to control the power correction system and the power added by the power supply system in response to the power factor variations.

14. The network according to claim 13 wherein the control system also controls load shedding.

15. The network according to claim 1 wherein the control system is arranged to control the power correction system and the power added by the power supply system in response to data communicated from the network control system.

* * * * *